United States Patent [19]

Raynolds et al.

[11] 4,432,882
[45] Feb. 21, 1984

[54] HYDROCARBON FOAMS

[75] Inventors: Stuart Raynolds, Wilmington, Del.; Louis B. Fournier, Media, Pa.

[73] Assignee: E. I. Du Pont de Nemours and Company, Wilmington, Del.

[21] Appl. No.: 331,892

[22] Filed: Dec. 17, 1981

[51] Int. Cl.$^3$ .................. E21B 43/26; E21B 43/27
[52] U.S. Cl. ................ 252/8.55 R; 166/308; 526/294; 252/307; 252/56 R
[58] Field of Search ............... 252/8.55 R, 307, 56 R; 166/308; 521/101; 524/59; 526/294

[56] References Cited

U.S. PATENT DOCUMENTS

| | | | |
|---|---|---|---|
| 3,282,905 | 11/1966 | Fasick et al. | 260/89.5 |
| 3,491,169 | 1/1970 | Raynolds et al. | 260/900 |
| 3,937,283 | 2/1976 | Blauer et al. | 166/307 |
| 3,980,136 | 9/1976 | Plummer et al. | 166/308 |
| 4,046,196 | 9/1977 | Brown et al. | 166/273 |
| 4,148,217 | 4/1979 | Engle | 73/60.1 |
| 4,194,566 | 3/1980 | Maly | 166/308 |

FOREIGN PATENT DOCUMENTS 6715160 1/1968 Netherlands ............... 526/294

OTHER PUBLICATIONS

"Fluorocarbon Surfactants: Their Current and Future Applications in Oil and Gas Well Stimulation" by David L. Holcomb presented Apr. 1971.
"Fluorocarbon Surfactants: Their Current and Future Applications in Oil and Gas Well Stimulation" by David L. Holcomb, presented Apr. 1977.

Primary Examiner—Christine M. Nucker

[57] ABSTRACT

Liquid hydrocarbon foams containing from 0.05 to 5 wt. % of a fluorocarbon polymer containing from 25 to 60 wt. % units of the structure

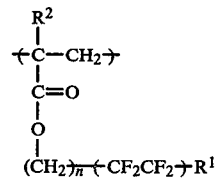

where —$R^1$ is —H or —F, m is an integer from 2 to 10, and n is 1 or 2 and 75 to 40 wt. % units of the structure

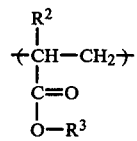

where —$R^3$ is an alkyl group containing from 10 to 20 carbon atoms. The foams are useful as oil and gas well fracturing fluids and for applying the fluorocarbon polymer to textiles as an oil and water repellant.

3 Claims, 2 Drawing Figures

HYDROCARBON FOAMS

BACKGROUND OF THE INVENTION

1. Field of the Invention

The present invention relates to foams derived from hydrocarbon liquids which contain fluoropolymer foaming agents and their use in fracturing subterranean formations.

2. Prior Art

"Fluorocarbon Surfactants: Their Current and Future Applications in Oil and Gas Well Stimulation," by David L. Holcomb, presented at the 18th Annual Southwestern Petroleum Short Course, Lubbock Texas, April, 1971, and "Fluorocarbon Surfactants: Their Current and Future Applications in Oil and Gas Well Stimulation," by David L. Holcomb, presented at the 24th Annual Southwestern Petroleum Short Course, Lubbock, Texas, April, 1977, both disclose the use of fluorocarbon surfactants in oil and gas well stimulation.

U.S. Pat. Nos. 3,282,905 and 3,491,169 both disclose copolymers of alkyl acrylates or alkyl methacrylates with fluoroalkyl acrylates or fluoroalkyl methacrylates.

U.S. Pat. No. 3,937,283 discloses foam fracturing subterranean formations.

U.S. Pat. No. 4,148,217 discloses a method for obtaining a measure of foam quality so that surfactants can be evaluated for a steam-diversion oil recovery process.

SUMMARY OF THE INVENTION

The present invention relates to foams prepared from hydrocarbon liquids and a partially fluorinated methacrylate or acrylate polymer. The foams are useful in fracturing oil and gas wells and in applying the fluorinated polymer to various textiles.

DETAILED DESCRIPTION

Figure 1:
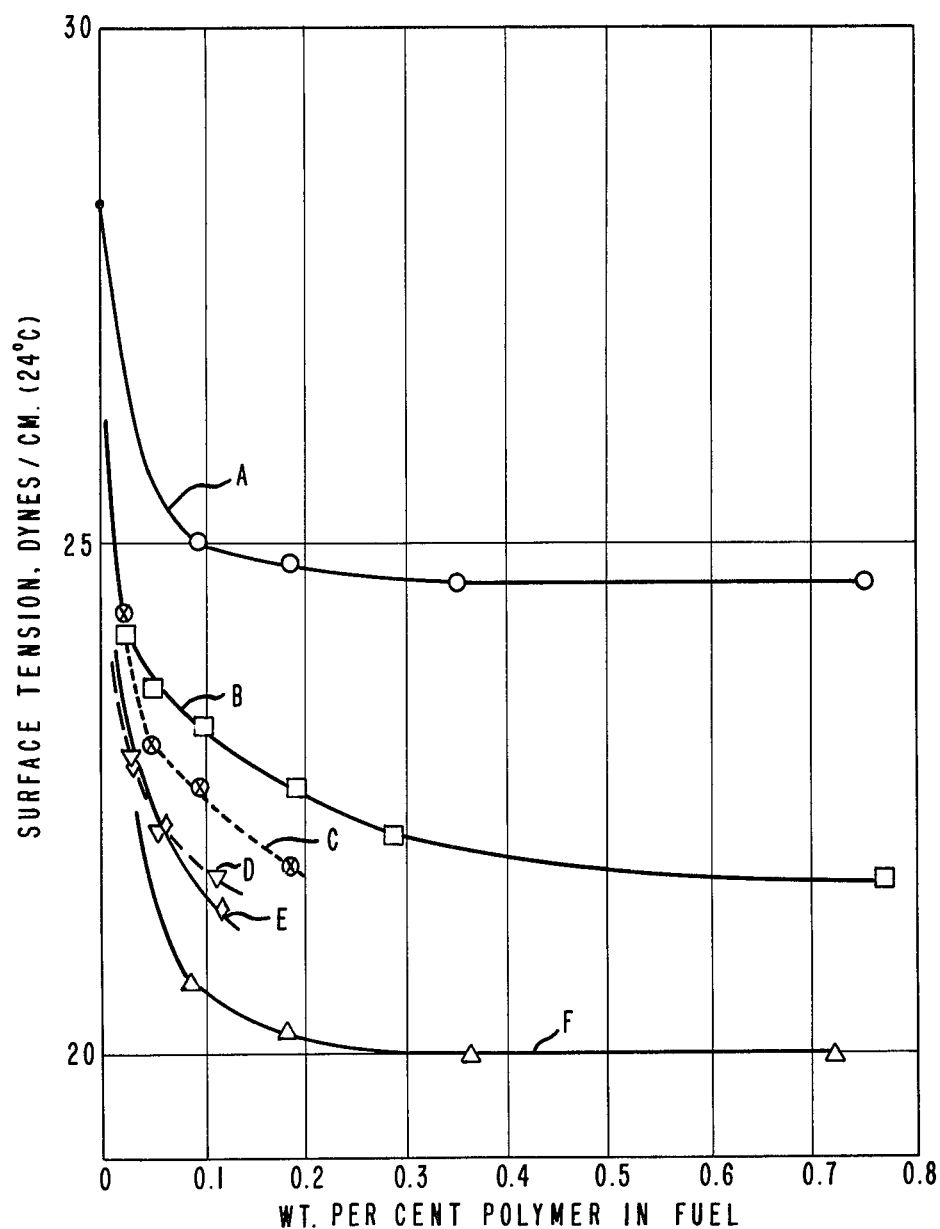
FIG. 1 is a plot of surface tension vs % fluorinated polymer in No. 2 diesel fuel.

In accordance with the present invention liquid hydrocarbons are foamed using a fluorinated polymer. The fluorinated polymer used herein are random copolymers containing 25 to 60 wt. % repeating units of the structure

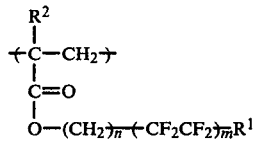

where $-R^1$ is $-H$ or $-F$, $-R^2$ is $-H$ or $-CH_3$, m is an integer from 2 to 10, and n is 1 or 2; and from 75 to 40 wt. % repeating units of the structure

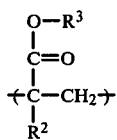

where $-R^2$ has the previously defined meaning and $-R^3$ is an alkyl group containing from 10 to 20 carbon atoms. Generally the copolymer will have an inherent viscosity of from 0.1 to 1.0 as measured from a 0.5% (weight/volume) solution in 1,1,2-trichloro-1,2,2-trifluoroethane, at 30° C. The copolymers can be prepared by the polymerization technique described in U.S. Pat. No. 3,491,169.

Suitable liquid hydrocarbons include various distillate fractions such as naphtha, kerosene, heavy gas oil and crude oil. The crude oils can be essentially any type crude including paraffinic, naphthenic, aromatic and mixed base. The copolymers of the present invention can even foam 18° API gravity asphaltic crudes. For oil well fracturing the fluorocarbon copolymer will be present in an amount of from 0.05 to 5 wt. % of the hydrocarbon. When the foam is being used to apply the fluorinated copolymer to a fabric as an oil and water repellant a light hydrocarbon liquid fraction should be used. For this application the fluorinated copolymer will be present in an amount of from 0.15 to 0.6 wt. % of the hydrocarbon. The foams of the present invention are also useful as spray oils which generally boil at 650°-700° F. (343°-371° C.) for use in insecticide sprays, etc.

For use in oil and gas well fracturing the fluorochemical will generally be added to the hydrocarbon along with whatever other agents are to be used such as a propping agent and the resulting composition foamed with a gas such as nitrogen or air. Once the foam is prepared it is rapidly pumped into the well which penetrates the subterranean formation where fracturing is desired. The rapid pumping of the foam creates a hydrostatic force which energizes splitting forces in the confined zone. Pressures as high as 20,000 psi (137880 kPa) are employed to effect formation fracturing.

As cracks and channels are formed, a propping agent which is suspended in the foam penetrates the newly created fissures and becomes lodged therein. The function of the propping agent is to support the fissures in an open position as a conduit for the flow of fluids such as oil, gas or water through the fractured zone. Various non-compressible materials are employed as proppants. These include sand, glass beads, alumina spheres and the like.

After a fracturing operation has been completed and the propping agent has been deposited, the hydrostatic pressure is released, the flow of fluid or foam is reversed, and the foam is withdrawn.

Hence, the foams of the present invention serve as a hydraulic fracturing fluid to force fracturing under hydrostatic pressure, and it serves to transport the suspension of propping agent into the porous subterranean formations.

The use of foamed crude oil for hydraulic fracturing has several advantages. First, since the crude can be from the formation being fractured there is no danger of contaminating the formation being fractured with a strange fluid which can have a deleterious effect on the formation. Second, since the crude being used is at the well site there is no need to transport the fracturing fluid to the well site. This can be very important in fracturing formations at well sites which are periodically inaccessible such as North Slope wells or North Sea wells. Third, since the fracturing fluid used herein is a foam, the gas used accounts for a substantial amount of the volume of the foam so that a much smaller amount of liquid is required.

A foam is a stable mixture of a gas, a liquid and a surface active agent which in the present invention is a fluorinated polymer. The gaseous phase exists as microscopic bubbles contained in the liquid and surface active agent mixture. Foam quality (F.Q.) is the ratio of gas volume (Vg) to total foam volume (Vf) at a specified temperature and pressure: F.Q.=Vg/Vf. Foams having foam qualities between zero and 0.52 contain spherical gas bubbles uniformly dispersed in the liquid, which bubbles do not contact each other. Flow properties of foams with qualities below 0.52 are Newtonian. At 0.52 quality the spherical bubbles are packed cubically and begin to interfere with each other during flow. Between F.Q. 0.52 and 0.74, static foam bubbles will form spheres packed rhombohedrally which deform to parallelepipeds during flow. Above 0.74 foam quality the static bubbles are no longer spheres and deform to parallelepipeds during flow. Parallelepipeds are the only geometric configurations which can flow as laminae. Laminar flow requires the expenditure of less pumping energy than other configurations, so foam qualities of at least 0.52 and preferably over 0.74 are preferred for well fracturing. The upper limit of foam quality for well fracturing is 0.999 with 0.85 being the preferred upper limit.

The "half life" (T ½) of a foamed liquid is the time necessary for foamed fluid to degrade to half of the eventual infinity volume of liquid. It can be read directly from the plot of "% liquid drained" versus time. That is, it is the time required for 50% of the liquid to be drained.

In oil and gas well applications, the term "foam" is generally meant to include fluids which may contain large inert solids, small chemically active solids such as bentonite, active chemicals, and several gases such as air, nitrogen, natural gas, carbon dioxide, etc.

EXAMPLES

Figure 2:
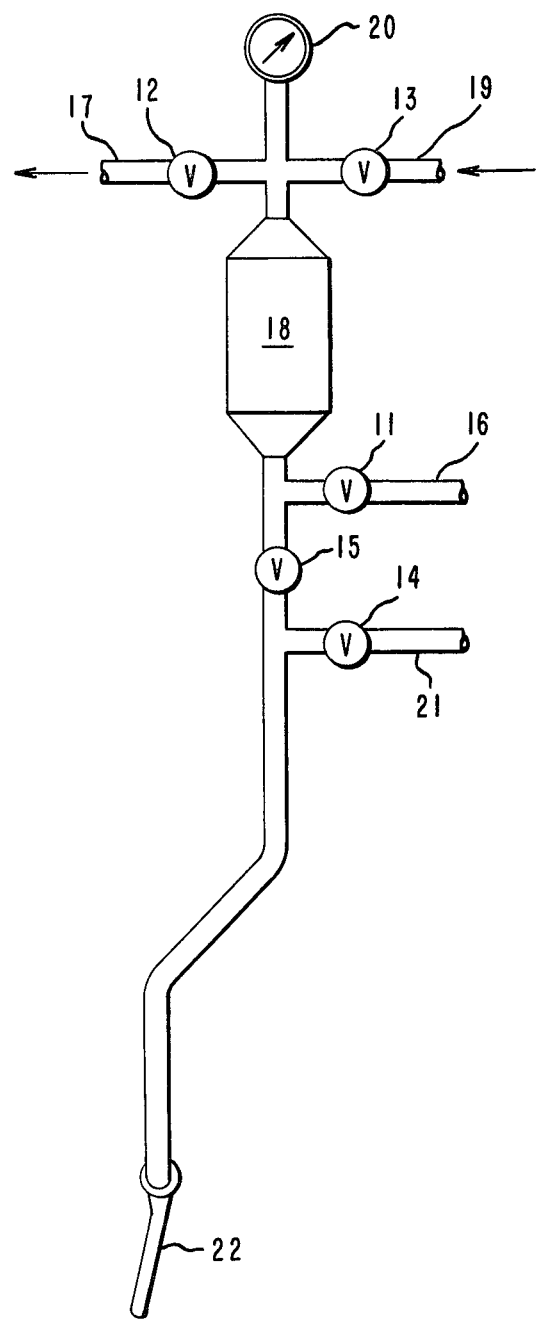
FIG. 2 is a schematic view of the apparatus used to produce the foams in Examples 1-8.

The foam generator used in the Examples is depicted in FIG. 2. To use the foam generator valves 11, 12, 13, 14 and 15 are all closed. A 100 ml graduated cylinder is filled with 100 ml of the sample to be tested. Sample feed line 16 is inserted until its face end is near the bottom of the 100 ml graduated cylinder. Valve 12 which is connected to vacuum line 17 is opened. Valve 11 is gradually opened, and the sample is sucked up in feed line 16 into reservoir 18 until there is about 18 ml of liquid left in the graduated cylinder at which time valves 11 and 12 are closed. Residual liquid in line 16 is allowed to drain back into the graduated cylinder. Valve 13 is opened to permit nitrogen in nitrogen feed line 19 to pressure reservoir 18. Valve 13 is adjusted so that pressure gauge 20 reads 100 psi (689 kPa). Valve 14 is opened and the air pump connected to line 21 is turned on to supply air at about 40 psi (275 kPa). The air will exit sample outlet 22. A 250 ml graduated cylinder is placed under sample outlet 22 to catch the foam. Valve 15 is opened quickly and the nitrogen pressure blows all of the sample from reservoir 18 in a few seconds. When the sample has emerged valve 15 is closed, a stopwatch is started and the original foam volume and initial liquid volume are recorded. The time when the liquid level in the 250 ml graduated cyclinder reaches ½ of the liquid volume fed to reservoir 18 from the 100 ml graduated cylinder is then recorded.

A series of runs are made as described above using 0.1% of various fluorinated polymeric surfactants in kerosene containing the % solids reported in Table I.

The fluorinated polymers were prepared from a monomer of the formula

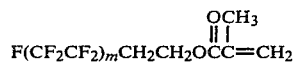

where m is a mixture principally of 3, 4 and 5 (ZFM) and lauryl methacrylate (LMA) in the weight ratio reported in Table I and FIG. 1. The molecular weight of the polymers was approximately 20,000 to 50,000.

TABLE I

| Example No | ZFM/LMA ratio | Initiator % | Foam, Half Life seconds | Solids % |
|---|---|---|---|---|
| 1 | 60/40 | 0.1 | 100 | 21.2 |
| 2 | 60/40 | 0.5 | 101 | 21.2 |
| 3 | 50/50 | 0.1 | 239 ± 23 | 25.0 |
| 4 | 50/50 | 0.5 | 218 ± 9 | 25.0 |
| 5 | 40/60 | 0.1 | 262 ± 28 | 29.7 |
| 6 | 40/60 | 0.5 | 211 ± 9 | 29.7 |
| 7 | 30/70 | 0.1 | 236 ± 19 | 36.7 |
| 8 | 30/70 | 0.5 | 191 | 36.7 |

The surprising effectiveness of the fluorinated polymers at reducing the surface tension of hydrocarbon liquids is illustrated by FIG. 1. FIG. 2 reports the surface tension of No. 2 diesel fuel when various amounts of the fluorocarbon polymers are incorporated therein. In FIG. 1 line "A" reports the incorporation of a 40/60 ZFM/LMA polymer, line "B" a 50/50 ZFM/LMA polymer, line "C" a 50/50 ZFM/LMA polymer, line "D" a 60/40 ZFM/LMA polymer having an inherent viscosity of 0.244, line "E" another 65/35 ZFM/LMA polymer and line "F" a 60/40 ZFM/LMA polymer having an inherent viscosity of 0.078.

EXAMPLE 9

An additional utility for the solutions of the present invention is treating fabrics to improve their oil and water repellency. A blue nylon taffeta fabric, about 3 ounces per square yard (0.1 Kg/m$^2$) was treated with the above-described 60/40 ZFM/LMA polymer at 0.3% polymer, on weight of fabric. The treatment comprised of a kiss roll application of a solution of the polymer in mineral spirits at 30%, on weight of fabric wet pickup. The fabric was oven dried at 270° F. (132° C.) and then cured at 320° F. (160° C.) for 90 seconds.

Table II reports the repellency data obtained on the fabric.

TABLE II

|  | Water Repellency[1] | Oil Repellency[2] |
|---|---|---|
| Initial | 100 | 4 |
| 3 Home Washes | 90 | 3 |
| 5 Home Washes | 70+ | 2 |
| 1 Dry Clean | 0 | 0 |

[1]Water Repellency spray test as determined by AATCC (American Association Textile Chemists Colorists) Test Method No. 22
[2]Oil Repellency as determined by AATCC Test Method No. 118

We claim:
1. A solution having a surface from about 20 to about 25 dynes per centimeter comprising a hydrocarbon liquid and from 0.05 to 5 percent by weight as based on the hydrocarbon liquid of a copolymer containing from 25 to 60 weight percent units of the structure

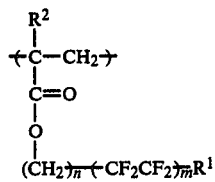

where —$R^1$ is —H or —F, —$R^2$ is —H or —$CH_3$, m is an integer from 2 to 10, and n is 1 or 2; and 75 to 40 weight percent units of the structure

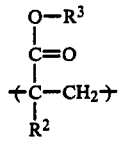

where —$R^3$ is an alkyl group containing from 10 to 20 carbon atoms and —$R^2$ has the above defined meaning.

2. A foam formed of the solution of claim 1.

3. A method of extending an initially fractured subterranean formation penetrated by a well bore with a foam, said foam comprising a hydrocarbon, a propping agent and from 0.05 to 5 weight percent as based on the hydrocarbon of a copolymer containing from 25 to 60 weight percent units of the structure

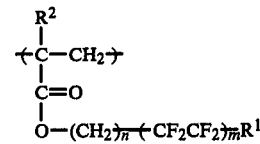

where —$R^1$ is —H or —F, —$R^2$ is —H or —$CH_3$, m is an integer from 2 to 10 and n is 1 or 2; and from 75 to 40 weight percent units of the structure;

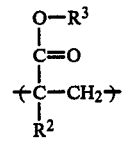

where —$R^3$ is an alkyl group containing from 10 to 20 carbon atoms and —$R^2$ has the above defined meaning.

* * * * *

UNITED STATES PATENT OFFICE
CERTIFICATE OF CORRECTION

PATENT NO. : 4,432,882
DATED : FEBRUARY 21, 1984
INVENTOR(S) : STUART RAYNOLDS and LOUIS B. FOURNIER It is certified that error appears in the above-identified patent and that said Letters Patent are hereby corrected as shown below:

In claim 1, line 1, after "surface" insert --tension--.

Signed and Sealed this

Eighth Day of May 1984

[SEAL]

Attest:

Attesting Officer

GERALD J. MOSSINGHOFF

Commissioner of Patents and Trademarks